(12) United States Patent
Sigmund (10) Patent No.: US 8,893,744 B2
(45) Date of Patent: Nov. 25, 2014

(54) TWO VALVE BREATHER SYSTEM FOR REAR DIFFERENTIAL

(75) Inventor: Joshua Sigmund, Hilliard, OH (US)

(73) Assignee: Honda Motor Co., Ltd, Tokyo (JP)

( * ) Notice: Subject to any disclaimer, the term of this patent is extended or adjusted under 35 U.S.C. 154(b) by 1731 days.

(21) Appl. No.: 12/119,724

(22) Filed: May 13, 2008

(65) Prior Publication Data

US 2009/0286649 A1    Nov. 19, 2009

(51) Int. Cl.
*F16K 24/00* (2006.01)
*F16H 57/027* (2012.01)

(52) U.S. Cl.
CPC .................................. *F16H 57/027* (2013.01)
USPC ........ 137/493.7; 137/351; 137/493; 74/606 R (58) Field of Classification Search
USPC ........ 137/351, 354, 493, 493.8, 493.7, 493.9; 74/606 A, 606 R
See application file for complete search history.

(56) References Cited

U.S. PATENT DOCUMENTS

| | | | |
|---|---|---|---|
| 3,314,306 A | 4/1967 | Barclae | |
| 3,686,973 A | 8/1972 | Davison, Jr. et al. | |
| 3,722,321 A * | 3/1973 | Walker et al. | 74/606 R |
| 4,151,761 A * | 5/1979 | Nishikawa et al. | 74/606 A |
| 4,468,979 A * | 9/1984 | Inagaki et al. | 74/606 R |
| 4,557,526 A | 12/1985 | Smith | |
| 4,595,118 A | 6/1986 | Azuma et al. | |
| 5,062,447 A | 11/1991 | Davison, Jr. et al. | |
| 5,344,101 A * | 9/1994 | Francois | 244/17.11 |
| 5,960,822 A * | 10/1999 | Matuschka et al. | 137/493.8 |
| 5,989,146 A | 11/1999 | Brown et al. | |
| 6,015,444 A * | 1/2000 | Craft et al. | 55/320 |
| 6,058,969 A * | 5/2000 | Bollwahn et al. | 137/583 |
| 6,168,400 B1 * | 1/2001 | Van Davelaar et al. | 417/571 |
| 6,447,565 B1 * | 9/2002 | Raszkowski et al. | 55/385.4 |
| 6,550,595 B2 | 4/2003 | Kuczera | |
| 6,553,865 B1 | 4/2003 | Endreszl | |
| 6,719,096 B2 * | 4/2004 | Mogi | 184/6.23 |
| 6,725,743 B2 | 4/2004 | White | |
| 6,837,821 B2 | 1/2005 | Teraoka et al. | |
| 6,840,137 B2 * | 1/2005 | Kaplan et al. | 74/606 R |
| 7,044,150 B2 | 5/2006 | Seidl | |
| 2003/0010151 A1* | 1/2003 | Johnson et al. | 74/606 R |
| 2003/0136219 A1* | 7/2003 | Gotou et al. | 74/606 R |
| 2004/0195058 A1* | 10/2004 | Ina et al. | 188/158 |
| 2007/0056400 A1 | 3/2007 | Kennedy | |
| 2007/0151790 A1 | 7/2007 | Thompson et al. | |

* cited by examiner

*Primary Examiner* — Kevin Murphy (74) *Attorney, Agent, or Firm* — Mark E. Duell; Emerson Thomson Bennett, LLC (57) ABSTRACT

A driveline component breather system that utilizes a first and a second valve assembly to control the intake and exhaustion of fluid within the driveline component to regulate internal pressures is provided. When the pressure within the driveline component increases the first valve closes or remains closed and the second valve opens and fluid is exhausted to the atmosphere. When the pressure within the driveline component decreases, the first valve opens and the second valve closes and fluid flows into the driveline component from an interior portion of an associated vehicle.

20 Claims, 6 Drawing Sheets

TWO VALVE BREATHER SYSTEM FOR REAR DIFFERENTIAL

I. BACKGROUND OF THE INVENTION

A. Field of Invention

This invention pertains to the art of methods and apparatuses regarding the manufacture of vehicle drive trains, and more specifically to the art of methods and apparatuses regarding ventilation or breather systems of vehicle drive train driveline components.

B. Description of the Related Art

It is known to use on-demand four wheel drive systems with sport utility vehicles. These sport utility vehicles allow for a relatively reduced weight and increased fuel efficiency without sacrificing four wheel drive performance characteristics. Commonly, the on-demand four wheel drive system employs a clutch mechanism inside the rear differential housing as a torque transfer device. It is known that most driveline components, such as the rear differential, comprise interior components, located within a differential housing assembly, that are required to rotate at very high speeds. These interior components are capable of reaching rotational speeds in excess of 5,000 rotations per minute (rpm) during operation of the associated vehicle. These components require constant immersion in a lubricating fluid and commonly, are bathed in a fluid sump. The interior portions of the differential housing assembly often undergo severe temperature changes ranging from atmospheric temperature to considerably higher temperatures dependent upon the severity of use. Due to the differential housing being generally sealed to prevent loss of lubricant and to prevent foreign particles from entering the interior portion of the housing, the noted temperature changes causes corresponding temperature changes in the lubricant. These temperature changes are reflected in pressure changes within the housing. The temperature and pressure changes can inflict severe strain on the housing seals resulting in premature wear of and even complete failure of the seals. In addition, the high temperatures sustained in pressure build-up within the housing can be detrimental to the moving parts within the housing in causing premature wear or failure of these parts and in addition can undesirably heat other assemblies located near the housing.

It is known to use a ventilation system in conjunction with a vehicle driveline component such as the rear differential. The ventilation system vents the high pressure building within the interior portion of the driveline component to the atmosphere in order to allow the components to operate at or as near to atmospheric pressure as possible. The operation of the driveline component at or near atmospheric pressure ensures the longer life of the seals within the driveline components. The inlet to the ventilation system must be located in a dry, vented area in order to meet performance and marketability requirements. The inlet must be located in a position that does not permit water or other debris to enter through the inlet during vehicle operations, specifically, four wheel drive operations such as off-road driving, water fording, and boat launching. Conventionally, the inlet is coupled to the underside portion of the vehicle body and during four wheel driver operations, the inlet is often positioned under or surrounded by water.

II. SUMMARY OF THE INVENTION

According to one embodiment of the invention, a driveline component comprises a housing, a clutch assembly positioned within the housing, a coupling assembly, and a breather system. The housing comprises a first breather system aperture. The coupling assembly at least partially facilitates the transfer of torque between the driveline component and a drive shaft assembly. The breather system comprises a first conduit, a second conduit, a first valve assembly, and a second valve assembly. The first conduit comprises a first end and a second end, wherein the first end is positioned within an interior portion of an associated vehicle and the second end is coupled to the housing through the first breather system aperture. The second conduit comprises a third end and a fourth end, wherein the third end is positioned outside of the interior portion of the associated vehicle and the fourth end is coupled to the housing through the first breather system aperture. The first valve assembly is for use in allowing air from within the interior portion of the vehicle to pass into the housing through the first conduit, wherein the first valve assembly is positioned within the first conduit. The second valve assembly is for use in allowing air from within the housing to pass to the atmosphere, wherein the second valve assembly is positioned within the second conduit.

According to one embodiment of the invention, a driveline component comprises a housing, a clutch assembly positioned within the housing, a coupling assembly, and a breather system. The housing comprises a first breather system aperture and a second breather system aperture. The coupling assembly at least partially facilitates the transfer of torque between the driveline component and a drive shaft assembly. The breather system comprises a first conduit, a second conduit, a first valve assembly, and a second valve assembly. The first conduit comprises a first end and a second end, wherein the first end is positioned within an interior portion of an associated vehicle and the second end is coupled to the housing through the first breather system aperture. The second conduit comprises a third end and a fourth end, wherein the third end is positioned outside of the interior portion of the associated vehicle and the fourth end is coupled to the housing through the second breather system aperture. The first valve assembly is for use in allowing air from within the interior portion of the vehicle to pass into the housing through the first conduit, wherein the first valve assembly is positioned within the first conduit. The second valve assembly is for use in allowing air from within the housing to pass to the atmosphere, wherein the second valve assembly is positioned within the second conduit.

According to one embodiment of the invention, a driveline component comprises a housing, a clutch assembly positioned within the housing, a coupling assembly, and a breather system. The housing comprises a first breather system aperture. The coupling assembly at least partially facilitates the transfer of torque between the driveline component and a drive shaft assembly. The breather system comprises a first conduit, a second conduit, a common conduit, a first valve assembly, and a second valve assembly. The first conduit comprises a first end and a second end, wherein the first end is positioned within an interior portion of an associated vehicle and the second end is coupled to a fifth end of the common conduit. The second conduit comprises a third end and a fourth end, wherein the third end is positioned outside of the interior portion of the associated vehicle and the fourth end is coupled to the fifth end of the common conduit. The first valve assembly is for use in allowing air from within the interior portion of the vehicle to pass into the housing through the first conduit, wherein the first valve assembly is positioned within the first conduit. The second valve assembly is for use in allowing air from within the housing to pass to the atmosphere, wherein the second valve assembly is positioned within the second conduit. The common conduit comprises the fifth end and a sixth end, wherein the sixth end is coupled to the housing through the first breather system aperture.

According to one embodiment of the invention, a driveline component comprises a housing, a clutch assembly positioned within the housing, a coupling assembly, and a breather system. The housing comprises a first breather system aperture. The coupling assembly at least partially facilitates the transfer of torque between the driveline component and a drive shaft assembly. The breather system comprises a first conduit, a second conduit, a first valve assembly, and a second valve assembly. The first conduit comprises a first end and a second end, wherein the first end is positioned within an interior portion of an associated vehicle and the second end is coupled to the housing through the first breather system aperture. The second conduit comprises a third end and a fourth end, wherein the third end is positioned outside of the interior portion of the associated vehicle and the fourth end is coupled to the housing through the first breather system aperture. The first valve assembly is for use in allowing air from within the interior portion of the vehicle to pass into the housing through the first conduit, wherein the first valve assembly is positioned within the first conduit. The second valve assembly is for use in allowing air from within the housing to pass to the atmosphere, wherein the second valve assembly is positioned within the second conduit. The driveline component comprises a component selected from the group consisting of a rear differential, a front differential, or a center differential.

According to one embodiment of the invention, a driveline component comprises a housing, a clutch assembly positioned within the housing, a coupling assembly, a breather box assembly, and a breather system. The housing comprises a first breather system aperture. The coupling assembly at least partially facilitates the transfer of torque between the driveline component and a drive shaft assembly. The breather system comprises a first conduit, a second conduit, a first valve assembly, and a second valve assembly. The first conduit comprises a first end and a second end, wherein the first end is positioned within an interior portion of an associated vehicle. The second conduit comprises a third end and a fourth end, wherein the third end is positioned outside of the interior portion of the associated vehicle. The first valve assembly is for use in allowing air from within the interior portion of the vehicle to pass into the housing through the first conduit, wherein the first valve assembly is positioned within the first conduit. The second valve assembly is for use in allowing air from within the housing to pass to the atmosphere, wherein the second valve assembly is positioned within the second conduit. The breather system is coupled to the breather box assembly and the breather box assembly is coupled to the housing through the first breather system aperture.

According to one embodiment of the invention, a vehicle comprises a vehicle body and a power train system. The vehicle body defines an interior portion. The power train system comprises an engine assembly, a transmission assembly, a transfer case assembly, and a first drive train assembly. The first drive train assembly comprises a drive shaft component, an axle component, and a driveline component. The driveline component comprises a housing comprising a breather system aperture, a clutch assembly positioned within the housing, a coupling assembly that at least partially facilitates the transfer of torque between the driveline component and a drive shaft assembly, and a breather system. The breather system comprises a first conduit, a second conduit, a first valve assembly, and a second valve assembly. The first conduit comprises a first end and a second end, wherein the first end is positioned within an interior portion of an associated vehicle and the second end is coupled to the housing through the first breather system aperture. The second conduit comprises a third end and a fourth end, wherein the third end is positioned outside of the interior portion of the associated vehicle and the fourth end is coupled to the housing through the first breather system aperture. The first valve assembly is for use in allowing air from within the interior portion of the vehicle to pass into the housing through the first conduit, wherein the first valve assembly is positioned within the first conduit. The second valve assembly is for use in allowing air from within the housing to pass to the atmosphere, wherein the second valve assembly is positioned within the second conduit.

According to one embodiment of the invention, a vehicle comprises a vehicle body and a power train system. The vehicle body defines an interior portion. The power train system comprises an engine assembly, a transmission assembly, a transfer case assembly, and a first drive train assembly. The first drive train assembly comprises a drive shaft component, an axle component, and a driveline component. The driveline component comprises a housing comprising a breather system aperture, a clutch assembly positioned within the housing, a coupling assembly that at least partially facilitates the transfer of torque between the driveline component and a drive shaft assembly, and a breather system. The breather system comprises a first conduit, a second conduit, a first valve assembly, and a second valve assembly. The first conduit comprises a first end and a second end, wherein the first end is positioned within an interior portion of an associated vehicle and the second end is coupled to the housing through the first breather system aperture. The second conduit comprises a third end and a fourth end, wherein the third end is positioned outside of the interior portion of the associated vehicle and the fourth end is coupled to the housing through the second breather system aperture. The first valve assembly is for use in allowing air from within the interior portion of the vehicle to pass into the housing through the first conduit, wherein the first valve assembly is positioned within the first conduit. The second valve assembly is for use in allowing air from within the housing to pass to the atmosphere, wherein the second valve assembly is positioned within the second conduit.

According to one embodiment of the invention, a vehicle comprises a vehicle body and a power train system. The vehicle body defines an interior portion. The power train system comprises an engine assembly, a transmission assembly, a transfer case assembly, and a first drive train assembly. The first drive train assembly comprises a drive shaft component, an axle component, and a driveline component. The driveline component comprises a housing comprising a breather system aperture, a clutch assembly positioned within the housing, a coupling assembly that at least partially facilitates the transfer of torque between the driveline component and a drive shaft assembly, and a breather system. The breather system comprises a first conduit, a second conduit, a common conduit, a first valve assembly, and a second valve assembly. The first conduit comprises a first end and a second end, wherein the first end is positioned within an interior portion of an associated vehicle and the second end is coupled to a fifth end of the common conduit. The second conduit comprises a third end and a fourth end, wherein the third end is positioned outside of the interior portion of the associated vehicle and the fourth end is coupled to the fifth end of the common conduit. The first valve assembly is for use in allowing air from within the interior portion of the vehicle to pass into the housing through the first conduit, wherein the first valve assembly is positioned within the first conduit. The second valve assembly is for use in allowing air from within the housing to pass to the atmosphere, wherein the second valve assembly is positioned within the second conduit. The common conduit comprises the fifth end and a sixth end, wherein the sixth end is coupled to the housing through the first breather system aperture.

According to one embodiment of the invention, a vehicle comprises a vehicle body and a power train system. The vehicle body defines an interior portion. The power train system comprises an engine assembly, a transmission assembly, a transfer case assembly, and a first drive train assembly. The first drive train assembly comprises a drive shaft component, an axle component, and a driveline component. The driveline component comprises a housing comprising a breather system aperture, a clutch assembly positioned within the housing, a coupling assembly that at least partially facilitates the transfer of torque between the driveline component and a drive shaft assembly, and a breather system. The breather system comprises a first conduit, a second conduit, a first valve assembly, and a second valve assembly. The first conduit comprises a first end and a second end, wherein the first end is positioned within an interior portion of an associated vehicle and the second end is coupled to the housing through the first breather system aperture. The second conduit comprises a third end and a fourth end, wherein the third end is positioned outside of the interior portion of the associated vehicle and the fourth end is coupled to the housing through the first breather system aperture. The first valve assembly is for use in allowing air from within the interior portion of the vehicle to pass into the housing through the first conduit, wherein the first valve assembly is positioned within the first conduit. The second valve assembly is for use in allowing air from within the housing to pass to the atmosphere, wherein the second valve assembly is positioned within the second conduit. The driveline component comprises a component selected from the group consisting of a rear differential, a front differential, or a center differential.

According to one embodiment of the invention, a vehicle comprises a vehicle body and a power train system. The vehicle body defines an interior portion. The power train system comprises an engine assembly, a transmission assembly, a transfer case assembly, and a first drive train assembly. The first drive train assembly comprises a drive shaft component, an axle component, and a driveline component. The driveline component comprises a housing comprising a breather system aperture, a clutch assembly positioned within the housing, a coupling assembly that at least partially facilitates the transfer of torque between the driveline component and a drive shaft assembly, and a breather system. The breather system comprises a first conduit, a second conduit, a first valve assembly, and a second valve assembly. The first conduit comprises a first end and a second end, wherein the first end is positioned within an interior portion of an associated vehicle. The second conduit comprises a third end and a fourth end, wherein the third end is positioned outside of the interior portion of the associated vehicle. The first valve assembly is for use in allowing air from within the interior portion of the vehicle to pass into the housing through the first conduit, wherein the first valve assembly is positioned within the first conduit. The second valve assembly is for use in allowing air from within the housing to pass to the atmosphere, wherein the second valve assembly is positioned within the second conduit. The breather system is coupled to the breather box assembly and the breather box assembly is coupled to the housing through the first breather system aperture.

According to one embodiment of the invention, a method for ventilating a driveline component comprises the steps of (a) providing a vehicle comprising a driveline component comprising a housing and a breather system, wherein the breather system comprises a first conduit, and a second conduit; (b) opening a first valve assembly positioned within the first conduit when the housing comprises a first predetermined internal pressure, wherein opening the first valve assembly allows fluids to flow through the first conduit and into the housing from an interior portion of the vehicle and prevents fluids from flowing through the first conduit from the housing and into the interior portion of the vehicle; (c) closing a second valve assembly positioned within the second conduit when the housing comprises the first predetermined internal pressure, wherein the closing the second valve assembly prevents fluids from flowing through the second conduit; (d) closing the first valve assembly when the housing comprises a second predetermined internal pressure, wherein closing the first valve assembly prevents fluids from flowing through the first conduit; (e) opening the second valve assembly when the housing comprises a third predetermined internal pressure, wherein opening the second valve assembly allows fluids to flow through the second conduit from the housing to the ambient atmosphere external to the vehicle; and, (f) closing the second valve assembly when the housing comprises a fourth predetermined internal pressure.

According to one embodiment of the invention, a method for ventilating a driveline component comprises the steps of (a) providing a vehicle comprising a driveline component comprising a housing and a breather system, wherein the breather system comprises a first conduit, and a second conduit; positioning a first end of the first conduit such that ambient air located within the interior portion of the vehicle can enter into the first conduit through the first end; and, coupling a second end of the first conduit to the housing through a breather system aperture; (b) opening a first valve assembly positioned within the first conduit when the housing comprises a first predetermined internal pressure, wherein opening the first valve assembly allows fluids to flow through the first conduit and into the housing from an interior portion of the vehicle and prevents fluids from flowing through the first conduit from the housing and into the interior portion of the vehicle; (c) closing a second valve assembly positioned within the second conduit when the housing comprises the first predetermined internal pressure, wherein the closing the second valve assembly prevents fluids from flowing through the second conduit; (d) closing the first valve assembly when the housing comprises a second predetermined internal pressure, wherein closing the first valve assembly prevents fluids from flowing through the first conduit; (e) opening the second valve assembly when the housing comprises a third predetermined internal pressure, wherein opening the second valve assembly allows fluids to flow through the second conduit from the housing to the ambient atmosphere external to the vehicle; and, (f) closing the second valve assembly when the housing comprises a fourth predetermined internal pressure.

According to one embodiment of the invention, a method for ventilating a driveline component comprises the steps of (a) providing a vehicle comprising a driveline component comprising a housing and a breather system, wherein the breather system comprises a first conduit, and a second conduit; (b) opening a first valve assembly positioned within the first conduit when the housing comprises a first predetermined internal pressure, wherein opening the first valve assembly allows fluids to flow through the first conduit and into the housing from an interior portion of the vehicle and prevents fluids from flowing through the first conduit from the housing and into the interior portion of the vehicle; (c) closing a second valve assembly positioned within the second conduit when the housing comprises the first predetermined internal pressure, wherein the closing the second valve assembly prevents fluids from flowing through the second conduit; (d) closing the first valve assembly when the housing comprises a second predetermined internal pressure, wherein closing the first valve assembly prevents fluids from flowing through the first conduit; (e) opening the second valve assembly when the housing comprises a third predetermined internal pressure, wherein opening the second valve assembly allows fluids to flow through the second conduit from the housing to the ambient atmosphere external to the vehicle; and, (f) closing the second valve assembly when the housing comprises a fourth predetermined internal pressure. The second predetermined internal pressure is greater than the first predetermined internal pressure. The third predetermined internal pressure is greater than the second predetermined internal pressure. The fourth predetermined internal pressure is less than the third predetermined internal pressure and greater than the second predetermined internal pressure.

According to one embodiment of the invention, a method for ventilating a driveline component comprises the steps of (a) providing a vehicle comprising a driveline component comprising a housing and a breather system, wherein the breather system comprises a first conduit, and a second conduit; (b) opening a first valve assembly positioned within the first conduit when the housing comprises a first predetermined internal pressure, wherein opening the first valve assembly allows fluids to flow through the first conduit and into the housing from an interior portion of the vehicle and prevents fluids from flowing through the first conduit from the housing and into the interior portion of the vehicle; (c) closing a second valve assembly positioned within the second conduit when the housing comprises the first predetermined internal pressure, wherein the closing the second valve assembly prevents fluids from flowing through the second conduit; (d) closing the first valve assembly when the housing comprises a second predetermined internal pressure, wherein closing the first valve assembly prevents fluids from flowing through the first conduit; (e) opening the second valve assembly when the housing comprises a third predetermined internal pressure, wherein opening the second valve assembly allows fluids to flow through the second conduit from the housing to the ambient atmosphere external to the vehicle; and, (f) closing the second valve assembly when the housing comprises a fourth predetermined internal pressure. The second predetermined internal pressure is greater than the first predetermined internal pressure. The third predetermined internal pressure is greater than the second predetermined internal pressure. The fourth predetermined internal pressure is substantially the same as the second predetermined internal pressure.

According to one embodiment of the invention, a method for ventilating a driveline component comprises the steps of (a) providing a vehicle comprising a driveline component comprising a housing and a breather system, wherein the breather system comprises a first conduit, and a second conduit; coupling a breather box assembly to the housing through the breather system aperture; and, coupling the breather system to the breather box assembly; (b) opening a first valve assembly positioned within the first conduit when the housing comprises a first predetermined internal pressure, wherein opening the first valve assembly allows fluids to flow through the first conduit and into the housing from an interior portion of the vehicle and prevents fluids from flowing through the first conduit from the housing and into the interior portion of the vehicle; (c) closing a second valve assembly positioned within the second conduit when the housing comprises the first predetermined internal pressure, wherein the closing the second valve assembly prevents fluids from flowing through the second conduit; (d) closing the first valve assembly when the housing comprises a second predetermined internal pressure, wherein closing the first valve assembly prevents fluids from flowing through the first conduit; (e) opening the second valve assembly when the housing comprises a third predetermined internal pressure, wherein opening the second valve assembly allows fluids to flow through the second conduit from the housing to the ambient atmosphere external to the vehicle; and, (f) closing the second valve assembly when the housing comprises a fourth predetermined internal pressure.

One advantage of this invention is that the outlet of the ventilation system is located in a dry vented area that allows for the venting of high pressure building within the interior portion of the driveline component to the atmosphere in order to allow the internal components of the driveline component to operate at or near to atmospheric pressure, thereby extending the life of the components.

Another advantage of this invention is that the inlet of the ventilation system is located in a position that does not permit water or other debris to enter through the inlet during four wheel drive vehicle operations such as off-road driving, water fording, and boat launching.

Another advantage of this invention is that odors emanating from the fluids located within the interior portion of the driveline component are prevented from entering the interior portion of the vehicle.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
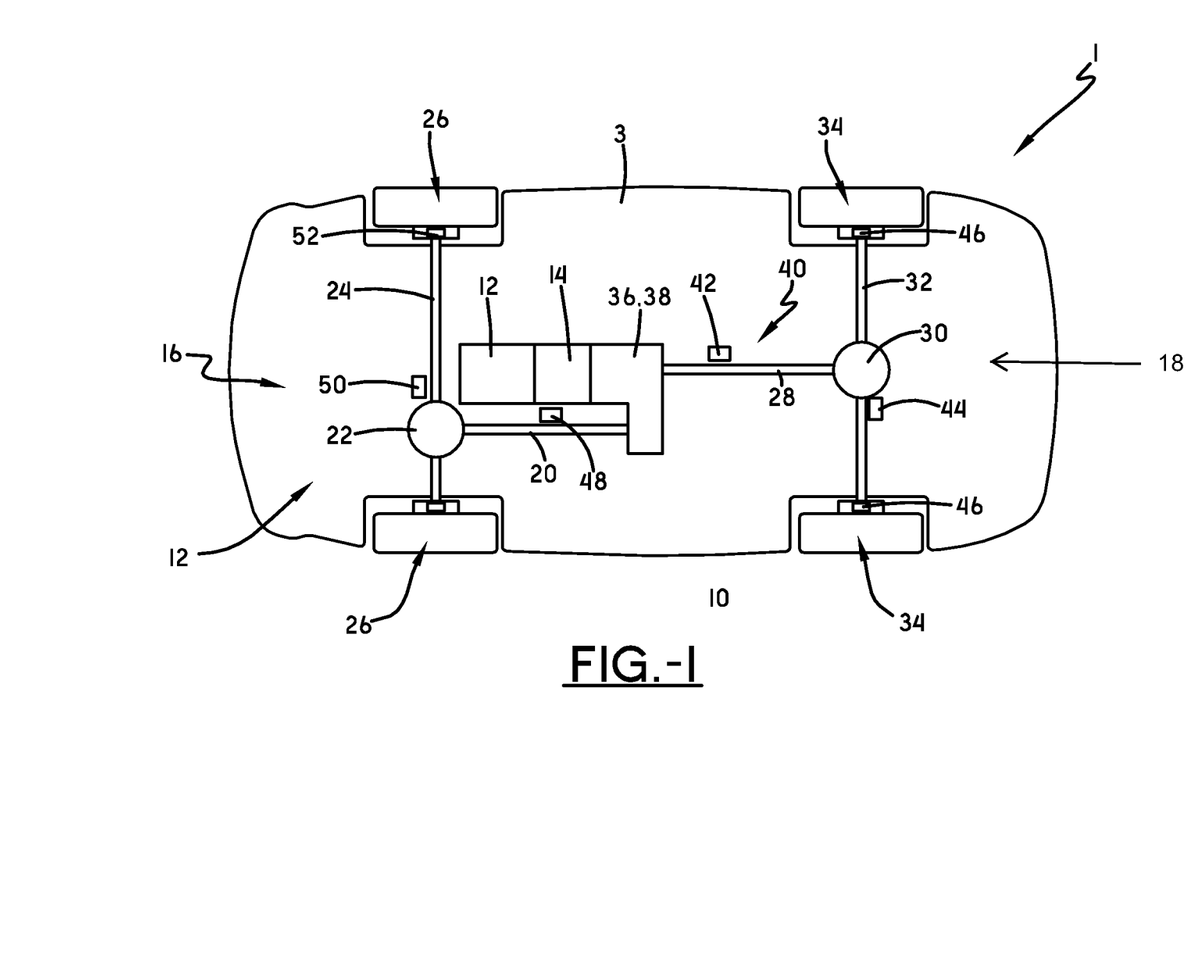
FIG. 1 is a bottom schematic view of a vehicle comprising a driveline component comprising a two valve breather system according to one embodiment of the invention.

Referring now to the drawings wherein the showings are for purposes of illustrating embodiments of the invention only and not for purposes of limiting the same, FIG. 1 shows a vehicle 1 comprising a vehicle body 3 and a power train system 10. The power train system 10 may include an engine 12, a transmission 14, a transfer case 36, a front drive train 16, and a rear drive train 18. The transfer case 36 may be a clutch-type transfer case or any suitable type of transfer case chosen with sound judgment by a person of ordinary skill. The front drive train 16 may comprise a front drive shaft 20, a front differential 22, a front axle 24, and a plurality of front ground-engaging wheels 26. The rear drive train 18 may comprise a rear drive shaft 28, a rear differential 30, a rear axle 32, and a plurality of rear ground engaging wheels 34.

With continued reference now to FIG. 1, the engine 12 may cause the propulsion of the vehicle 1 by generating an input torque that is altered by a plurality of gear sets (not shown) of the transmission 14. The transmission 14 may provide the input torque to the transfer case 36. The amount of input torque provided to the transfer case 36 may be altered by the plurality of gear sets (not shown) of the transmission 14, by inertial losses in the power train system 10, and various other factors as is well known in the art. The transfer case 36 may supply the input torque to one or both of the front drive train 16 and the rear drive train 18. The engine 12 may supply an input torque that is passed through the transmission 14 and the transfer case 36. The transfer case 36 may supply the input torque to the rear drive shaft 28. The rear drive shaft 28 may then supply the input torque to the rear differential 30. The rear differential 30 may then supply the input torque to the rear axle 32 and ultimately to the plurality of rear ground engaging wheels 34. In another embodiment, the transfer case 36 may supply the input torque to the front drive shaft 20. The front drive shaft 20 may then supply the input torque to the front differential 22. The front differential 22 may then supply the input torque to the front axle 24 and ultimately to the plurality of front ground engaging wheels 26. In yet another embodiment, the transfer case 36 may supply the input torque to both the front drive shaft 20 and the rear drive shaft 28.

With continued reference now to FIG. 1, in one embodiment, the transfer case 36 may comprise an all wheel drive system 38 that generally controls whether the input torque supplied by the engine 12 is supplied only to either the rear drive train 18 or the front drive train 16, or, if the input torque is supplied to both the front and rear drive trains 16, 18. The all wheel drive system 38 may comprise a sensor system 40 that is operable to detect the speed of the front drive train 16 and the speed of the rear drive train 18. In one embodiment, the sensor system 40 may comprise a rear drive shaft speed sensor 42 that detects the rotational speed of the rear drive shaft 28; a rear axle speed sensor 44 that detects the rotational speed of the rear axle 32; and, a plurality of rear ground engaging wheel sensors 46 that detect the rotational speed of the plurality of rear ground engaging wheels 34. Additionally, the sensor system 40 may include a front drive shaft speed sensor 48 that detects the rotational speed of the front drive shaft 20; a front axle speed sensor 50 that detects the rotational speed of the front axle 24; and, a plurality of front ground engaging wheel sensors 52 that detect the rotational speed of the plurality of front ground engaging wheels 26. The sensor system 40 may include any combination of sensors for detecting the rotational speed of the front and rear drive trains 16, 18 chosen with sound judgment by a person of ordinary skill in the art. The sensor system 40 may comprise a controller (not shown) that is operable to cause the all wheel drive system 38 to distribute the input torque between the front drive train 16 and the rear drive train 18 depending upon the speed of the front drive train 16 and the rear drive train 18 as is well known in the art.

With reference now to FIGS. 1-4, for purposes of clarity, only the function and components of the rear differential 30 will be described. Embodiments described herein may be utilized with any differential component, such as the front differential 22 or a central differential component (not shown) positioned between the front and rear differentials 22, 30. Additionally, the embodiments described herein may be utilized with any other component used to provide the input torque to the plurality of front and rear ground engaging wheels 26, 34 comprising internal parts that rotate at high speeds requiring ventilation of the component's interior components to the atmosphere.

Figure 2:
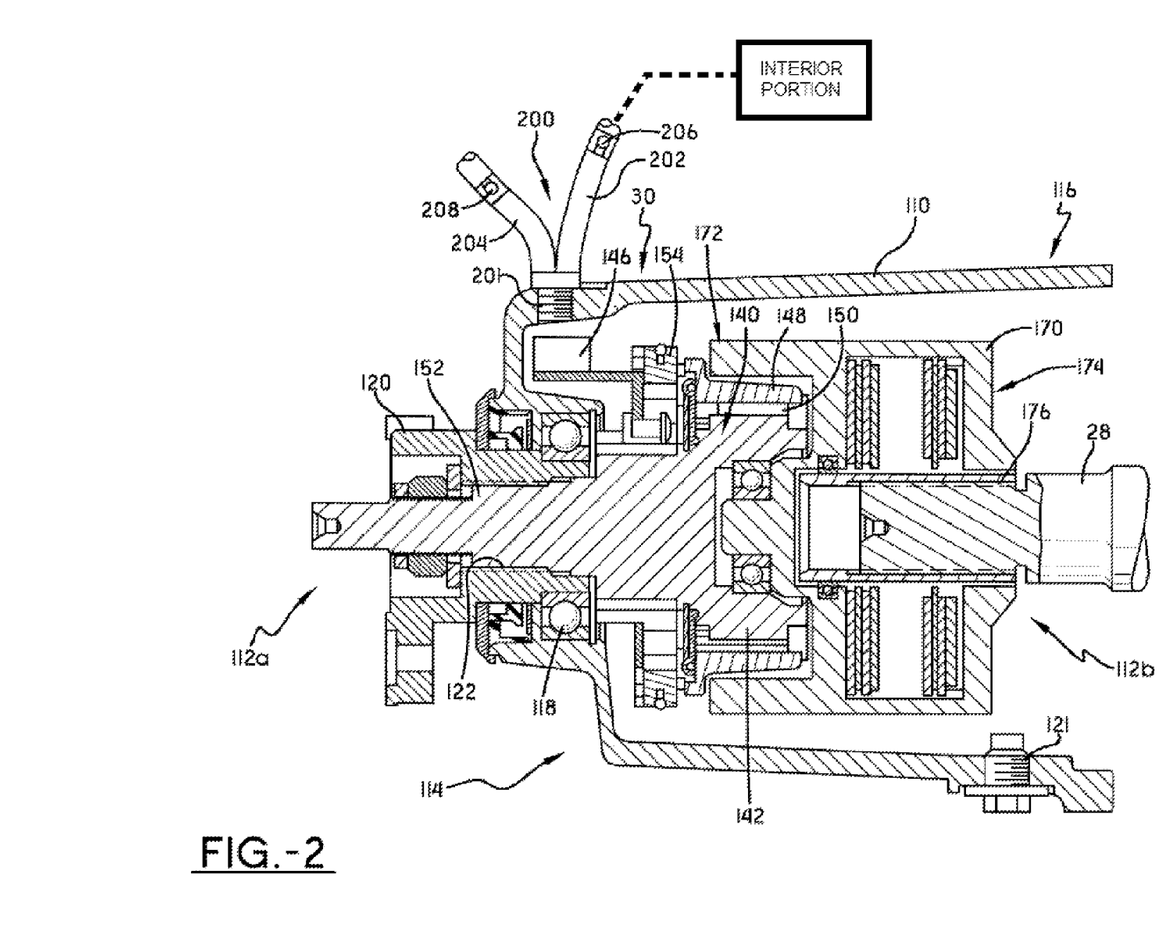
FIG. 2 is a cross-sectional view of a driveline component comprising a two valve breather system according to one embodiment of the invention.
Figure 3:
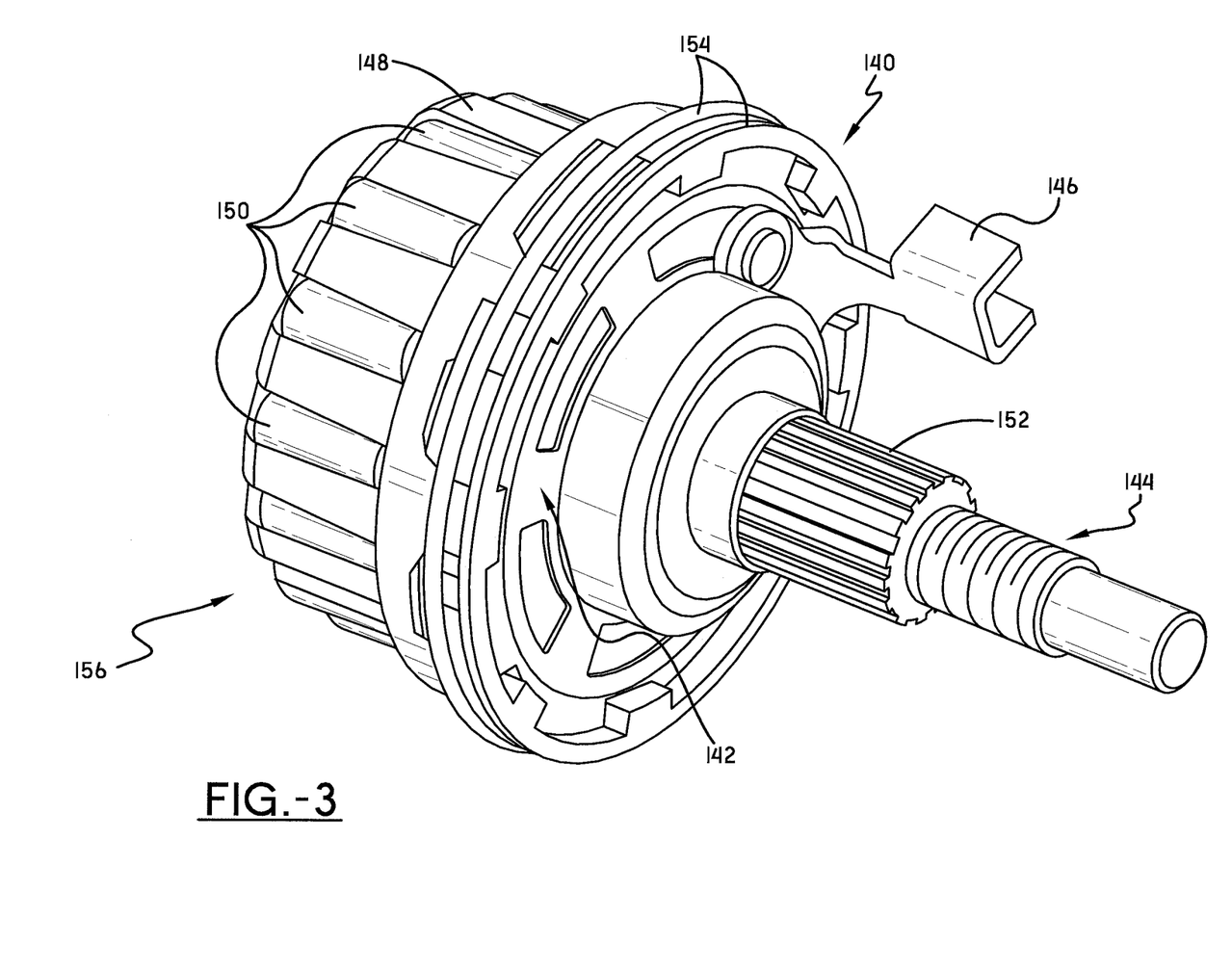
FIG. 3 is a perspective view of a clutch assembly of the driveline component shown in FIG. 2.

With reference now to FIGS. 1-3, the rear differential 30 may comprise a housing 110, a clutch assembly 140, a coupling assembly 170, and a ventilation or breather system 200 (shown in FIG. 2). The housing 110 may comprise a first interior end portion 112*a*, a second interior end portion 112*b*, a bottom housing portion 114, a top housing portion 116, a plurality of bearings 118, a housing flange 120, a breather aperture 201 and a housing aperture 121. The housing flange 120 may be rotatably supported within the first interior end portion 112*a*. In one embodiment of the invention, the plurality of bearings 118 may provide the rotatable support for the housing flange 120. The housing flange 120 may be rotatably supported with the first interior end portion 112*a* using any method chosen with sound judgment by a person of ordinary skill.

With reference now to FIGS. 2 and 3, the clutch assembly 140 may be secured to the housing flange 120. In one embodiment, the clutch assembly 140 may comprise a bi-directional clutch. In another embodiment of the invention, the clutch assembly 140 may comprise a single directional clutch. The clutch assembly 140 may comprise any type of clutch assembly chosen with sound judgment by a person of ordinary skill in the art. The clutch assembly 140 may comprise a clutch body 142, a neck portion 144, a friction grounding element 146, a roller cage 148, and a plurality of rollers 150. The clutch assembly 140 may be rotatably fixed to the housing flange 120. In one embodiment of the invention, the clutch assembly 140 may be rotatably fixed to the housing flange 120 by a plurality of clutch teeth 152 located on the neck portion 144 of the clutch assembly 140. The clutch assembly 140 may be rotatably secured to the housing flange 120 utilizing any method chosen with sound judgment by a person of ordinary skill in the art. The plurality of clutch teeth 152 located on the neck portion 144 of the clutch assembly 140 may mate with a plurality of flange teeth 122. The plurality of flange teeth 122 may be located on an inner surface of the housing flange 120. The mating of the plurality of clutch teeth 152 and the plurality of flange teeth 122 may create a rotationally fixed union between the housing flange 120 and the clutch assembly 140.

With continued reference to FIGS. 2 and 3, the friction grounding element 146 may be attached to the clutch body 142 and may comprise a plurality of friction brake shoes 154. The plurality of friction brake shoes 154 may provide the necessary frictional force required to operate the friction grounding element 146. The roller cage 148 may support and align the plurality of rollers 150. The plurality of rollers 150 may be aligned around an outer periphery 156 of the clutch body 142. The neck portion 144 may be located on the first interior portion end 112*a* of the housing 110. In one embodiment of the invention, the second interior portion end 112*b* may be positioned opposite of the first interior end portion 112*a*. The roller cage 148 may engage the plurality of friction brake shoes 154. The friction grounding element 146 may allow for the required friction torque necessary to be generated to bias the plurality of rollers 150 to one side or another of the flat surface of the clutch body 142. The biasing of the plurality of rollers 150 to one side or another of the flat surface of the clutch body 142 may at least partially cause the engaging of the rear differential 30 by the rotation of the rear drive shaft 28 in either a forward or reverse direction.

With reference now to FIGS. 2 and 3, the coupling assembly 170 may facilitate the transfer of torque between the rear drive shaft 28 and the rear differential 30. In one embodiment of the invention, the coupling assembly 170 may comprise a viscous coupling assembly. Any type of coupling assembly capable of facilitating the torque transfer between the rear drive shaft 28 and the rear differential 30, chosen with sound judgment by a person of ordinary skill, may be used. The coupling assembly 170 may comprise a first end 172 and a second end 174 located opposite of the first end 172. The first end 172 may be adjacent to and in contact with the plurality of rollers 150. The second end 174 may comprise a plurality of coupling teeth 176. The rear drive shaft 28 may be inserted and mated with the plurality of coupling teeth 176 to non-rotatably connect the rear drive shaft 28 and the coupling assembly 170. The housing aperture 121 may be located within the bottom housing portion 114. The housing aperture 121 may allow for the changing and draining of the fluid used to lubricate the rotating interior parts of the rear differential 30.

Figure 4:
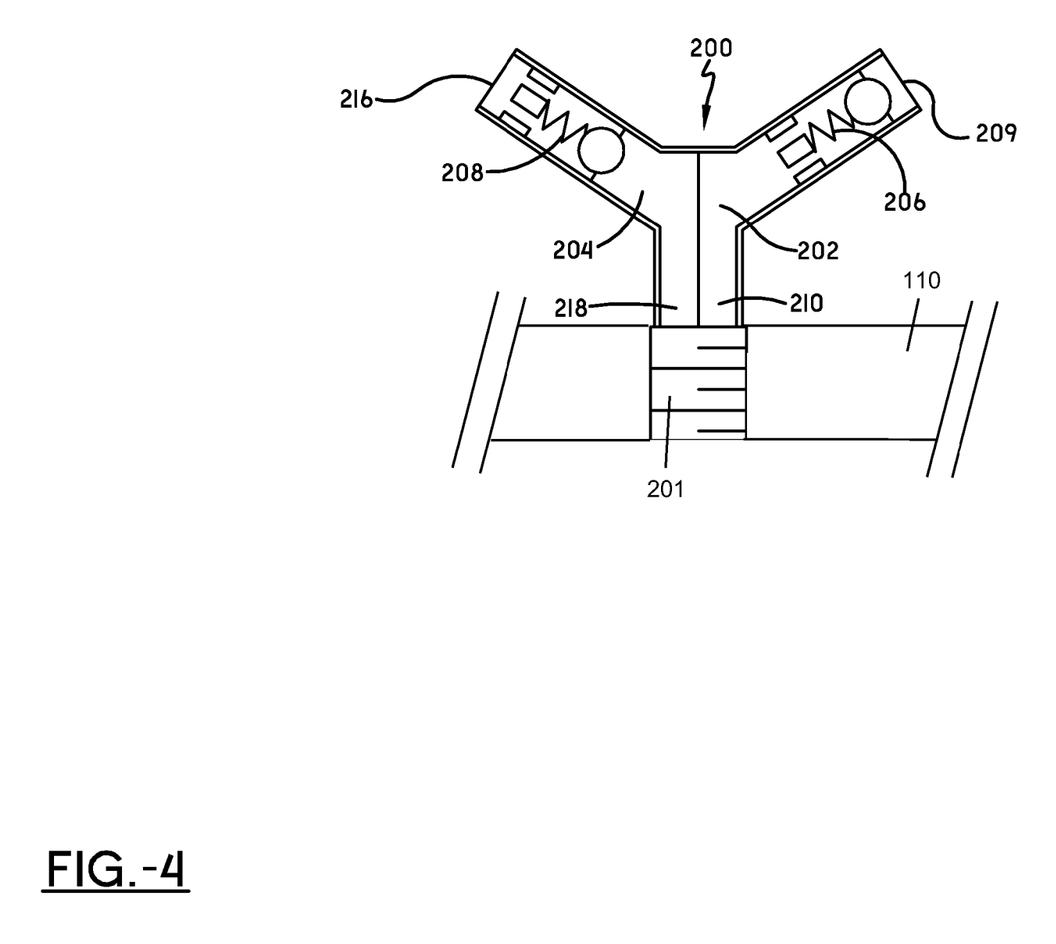
FIG. 4 is a cross-sectional view of a breather system according to one embodiment 2.
Figure 5:
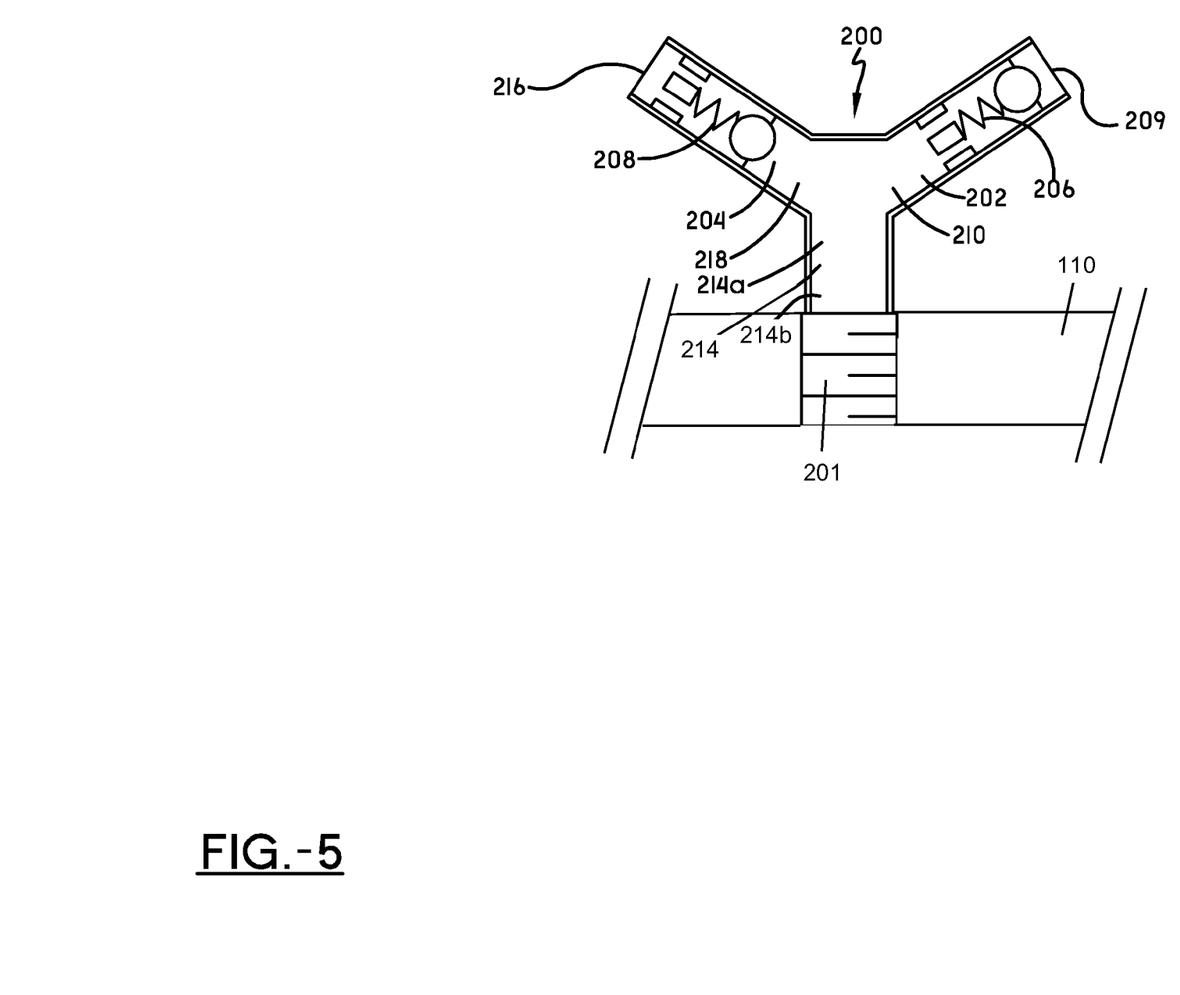
FIG. 5 is a cross-sectional view of a two-valve breather system having a common conduit according to one embodiment.
Figure 6:
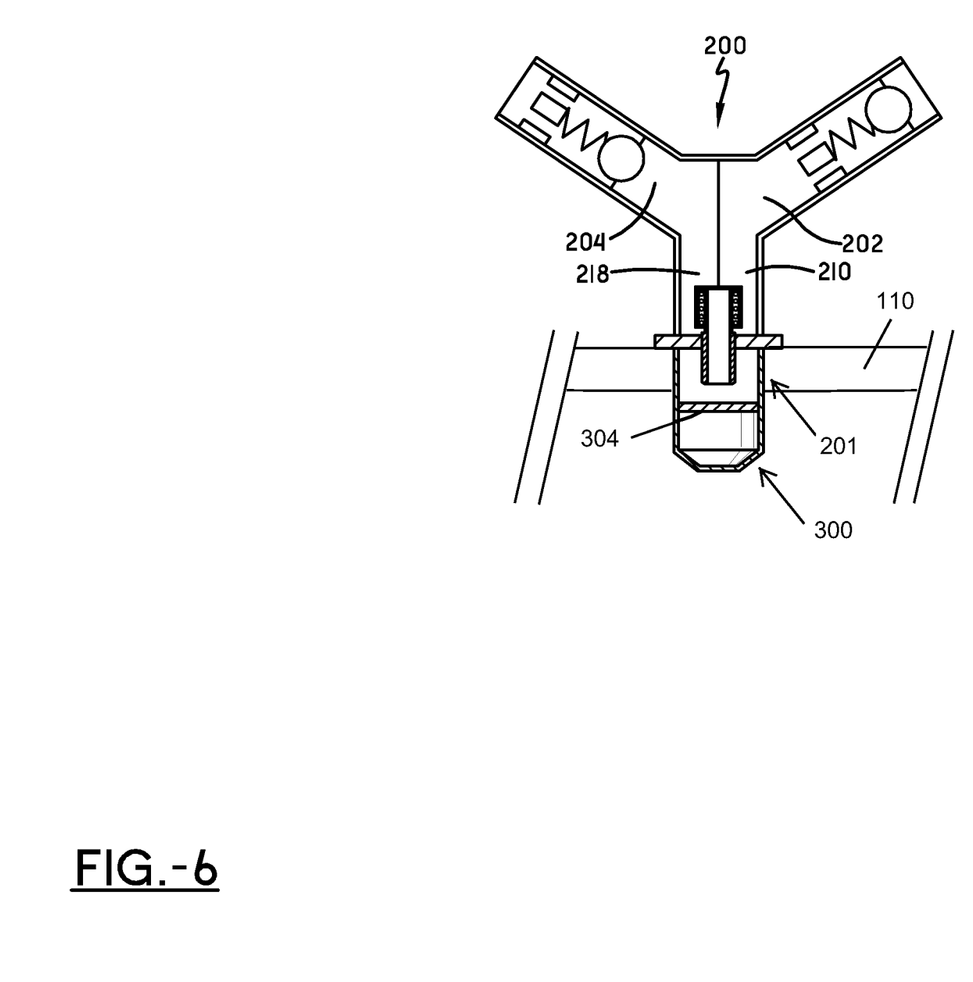
FIG. 6 is a cross-sectional view of a two-valve breather system coupled to a breather box assembly that is coupled to the driveline component according to one embodiment.

With reference now to FIGS. 1, 4 and 5, the breather system 200 may comprise a first conduit 202, a second conduit 204 a first valve assembly 206, and a second valve assembly 208. As shown in FIGS. 4 and 5, the first and second valve assemblies 206 and 208 are disposed to be biased closed independently of one another. Each valve assembly has its own spring in the exemplary embodiments. The first conduit 202 may comprise a first end 209 and a second end 210. The first end 209 may be positioned within an interior portion (not shown), defined by the vehicle body 3, of the vehicle 1 such that ambient air located within the interior portion can enter into the first conduit 202 via the first end 209. The interior portion may comprise any area at least partially protected by the vehicle body 3 from being subjected to external atmospheric conditions. Non-limiting examples of the interior portion may include a vehicle passenger compartment, a trunk area, and a space formed between the vehicle body 3 and an interior panel. The second end 210 may be coupled to the housing 110 through the breather aperture 201 of the rear differential 30. The breather aperture 201 may be positioned on the top housing portion 116. The first valve assembly 206 may be positioned within the first conduit 202. The first valve assembly 206 may be a one-way inlet valve that allows the passage of a fluid in a single direction only as is well known in the art. The second conduit 204 may comprise a first end 216 and a second end 218. The first end 216 may be coupled to the outer or underside portion 7 of the vehicle 1. The second end 218 maybe coupled to the housing 110 through the breather aperture 201 of the rear differential 30. In one embodiment, the first end 209 of the first conduit 202 may be coupled to the housing 110 through the breather aperture 201 and the second end 218 of the second conduit 204 may be coupled to the housing 110 through a second breather aperture 201 that is also positioned on the top housing portion 116. The second valve assembly 208 may be positioned within the second conduit 204. The second valve assembly 208 may be a one-way outlet valve that allows the passage of a fluid in a single direction only as is well known in the art. In another embodiment, the second end 210 of the first conduit 202 and the second end 218 of the second conduit 204 may each be coupled to an input end 214a of a common conduit 214. The common conduit 214 may comprise the input end 214a and an outlet end 214b. The outlet end 214b may be coupled to the housing 110 through the breather aperture 201. FIGS. 4-6 show that in embodiments of the invention the first and second conduits 202, 204 can merge in a Y configuration. In FIG. 4, the ends 210 and 218 are shared by the first and second conduits 202, 204 and respective lengths of the first and second conduits 202, 204 extend away from the ends 210, 218 are shared by the first and second conduits 202, 204 to a point of divergence, referenced at 260. FIG. 4 also shows that the remainders of the first and second conduits 202, 204 extend away from one another along transverse axes 262, 264. FIG. 4 also shows that the first and second valve assemblies 206, 208 are positioned in the respective remainders of the first and second conduits 202, 204.

With continuing reference to FIGS. 1, 4, and 5, in one embodiment, prior to beginning operation of the vehicle 1, the internal pressure within the housing 110 may be substantially the same as the pressure of the atmosphere of both outside of and within the vehicle 1. The first valve assembly 206 and the second valve assembly 208 may be closed to prevent the passage of fluid through the first or second conduits 202, 204 respectively. During the operation of the vehicle 1, the movement of the various differential components located within the housing 110 may cause the internal pressure within the housing 110 to be greater than the pressure of the atmosphere outside the vehicle 1. The difference in pressure may reach a first predetermined value, and may be sufficient to cause the second valve assembly 208 to open and allow air or other fluids to pass from the housing 110 to the atmosphere while the first valve assembly 206 remains closed. The releasing of pressure from within the housing 110 to the atmosphere may cause the internal pressure within the housing 110 to decrease. The reduction in internal pressure of the housing 110 may then cause the second valve assembly 208 to close thereby preventing the continued release of pressure from within the housing 110 to the atmosphere.

With continued reference now to FIGS. 1, 4, and 5, a decrease in temperature within the housing 110 may cause a vacuum to be generated within the housing 110 wherein the internal pressure within the housing 110 is less than the pressure of the atmosphere within the interior portion of the vehicle 1. The difference in pressures may reach a second predetermined value, and may be sufficient to cause the first valve assembly 206 to open and allow air from within the interior portion of the vehicle 1 to pass into the housing 110 while the second valve assembly 208 remains closed thereby preventing the passage of air to the atmosphere. The passage of air from the interior portion of the vehicle 1 to the housing 110 may cause the internal pressure within the housing to increase, eliminating the vacuum generated within the housing 110, and thereby causing the first valve assembly 206 to close. The closing of the first valve assembly 206 prevents the continued passing of air from the interior portion of the vehicle 1 to the housing 110.

With reference now to FIG. 6, in another embodiment, the second end 210 of the first conduit 202 and the second end 218 of the second conduit 204 may be coupled to a breather body 300. The breather body 300 may be threaded into the breather aperture 201 and may comprise an internal bore 302. The internal bore 302 may comprise a fluid blocking device 304 that prevents the internal fluids of the rear differential 30 from exiting the housing 110 via the breather system 200. In one embodiment, the fluid blocking device 304 comprises a pair of baffles that are offset from each other. In another embodiment, the fluid blocking device 304 comprises a mesh screen assembly. The fluid blocking device 304 may comprise any device for preventing the internal fluids of the rear differential 30 from exiting the housing 110 via the breather system 200 chosen with sound judgment by a person of ordinary skill.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. A driveline component comprising:
   a housing comprising a first breather system aperture;
   a clutch assembly positioned within the housing;
   a coupling assembly, wherein the coupling assembly at least partially facilitates the transfer of torque between the driveline component and a drive shaft assembly; and,
   a breather system comprising:
      a first conduit comprising a first end and a second end, wherein the first end is positioned within an interior portion of an associated vehicle that is one of a passenger compartment, a trunk area, and a space formed between a vehicle body and an interior vehicle panel, to prevent atmospheric air external to the vehicle from entering the first conduit, and the second end is coupled to the housing through the first breather system aperture;
      a second conduit comprising a third end and a fourth end, wherein the third end is positioned outside of the interior portion of the associated vehicle and the fourth end is coupled to the housing through the first breather system aperture;
      a first valve assembly for use in allowing air from within the interior portion of the vehicle to pass into the housing through the first conduit, wherein the first valve assembly is positioned within the first conduit;
      a second valve assembly for use in allowing air from within the housing to pass to the atmosphere, wherein the second valve assembly is positioned within the second conduit;
      wherein the first and second conduits merge in a Y configuration such that the second and fourth ends are shared by the first and second conduits and respective lengths of the first and second conduits extending away from the second and fourth ends are shared by the first and second conduits to a point of divergence and remainders of the first and second conduits extend away from one another along transverse axes; and
      wherein the first and second valve assemblies are positioned in the respective remainders of the first and second conduits.

2. The driveline component of claim 1, wherein the driveline component comprises:
   a component selected from the group consisting of a rear differential, a front differential, or a center differential.

3. A method for ventilating a driveline component comprising the steps of:
   providing:
      a vehicle comprising an interior portion that is one of a passenger compartment, a trunk area, and a space formed between the vehicle body and an interior vehicle panel; and
      the driveline component of claim 1;
   providing a first internal pressure within the housing wherein the first and second valve assemblies are closed to prevent the passage of fluid through the first and second conduits;
   operating the driveline component to change the internal pressure within the housing to a second internal pressure that is a first predetermined value that causes the second valve assembly to open to allow fluids to flow from the housing to the atmosphere through the second valve assembly while the first valve assembly remains closed;
   operating the driveline component to change the internal pressure within the housing to a third internal pressure that is a second predetermined value that causes the first valve assembly to open to allow fluids to flow from the interior portion of the vehicle to the housing through the first conduit and prevent atmospheric air external to the vehicle from entering the first conduit, while the second valve assembly remains closed; and
   disposing the first and second valve assemblies to be biased closed independently of one another.

4. The method of claim 3, wherein:
   after the step of operating the driveline component to change the internal pressure within the housing to the second internal pressure and before the step of operating the driveline component to change the internal pressure within the housing to the third internal pressure, the method comprises the step of:
      changing the internal pressure within the housing to a fourth internal pressure that causes the second valve assembly to close; and,
   after the step of operating the driveline component to change the internal pressure within the housing to the third internal pressure, the method comprises the step of:
      changing the internal pressure within the housing to a fifth internal pressure that causes the first valve assembly to close.

5. The method of claim 4, wherein:
   the first predetermined value is greater than the second predetermined value;
   the second internal pressure is greater than the first internal pressure;
   the second internal pressure is greater than the fourth internal pressure;
   the fourth internal pressure is greater than the third internal pressure; and,
   the fifth internal pressure is greater than the third internal pressure.

6. The method of claim 3, wherein the step of providing the driveline component further comprises the steps of:
   providing a breather box assembly; and
   coupling the breather box assembly to the housing through the first breather system aperture.

7. The method of claim 6, wherein:
   the breather box assembly comprises a fluid blocking device that prevents internal fluids from the driveline component from exiting the housing via the breather system.

8. The method of claim 3, wherein:
   the breather system further comprises a common conduit comprising a fifth end and a sixth end, wherein the second end of the first conduit and the fourth end of the second conduit are coupled to the fifth end of the common conduit, and wherein the sixth end of the common conduit is coupled to the housing through the first breather system aperture.

9. The driveline component of claim 1, wherein the interior portion is a passenger compartment.

10. The driveline component of claim 1, wherein the interior portion is a trunk area.

11. The driveline component of claim 1, wherein the interior portion is a space formed between the vehicle body and an interior vehicle panel.

12. The driveline component of claim 1, wherein the breather system further comprises a common conduit comprising a fifth end and a sixth end, wherein the second end of the first conduit and the fourth end of the second conduit are coupled to the fifth end of the common conduit, and wherein the sixth end of the common conduit is coupled to the housing through the first breather system aperture.

13. The driveline component of claim 1, further comprising a breather box assembly, wherein the breather system is coupled to the breather box assembly, and wherein the breather box assembly is coupled to the housing through the first breather system aperture.

14. The driveline component of claim 13, wherein the breather box assembly comprises a fluid blocking device that prevents internal fluids from the driveline component from exiting the housing via the breather system.

15. The driveline component of claim 14, wherein the fluid blocking device comprises a mesh screen assembly.

16. The driveline component of claim 14, wherein the fluid blocking device comprises a pair of baffles that are offset from each other.

17. The driveline component of claim 13, wherein the breather box assembly comprises a breather body that is threaded into the first breather system aperture.

18. A vehicle comprising:
a vehicle body defining an interior portion; and
a power train system operatively secured to the vehicle body, the power train system comprising:
  an engine assembly;
  a transmission assembly operatively connected to the engine assembly;
  a transfer case assembly operatively connected to the transmission assembly; and
  a first drive train assembly operatively connected to the transfer case assembly, the first drive train assembly comprising:
    a drive shaft assembly;
    an axle assembly; and
    the driveline component of claim 1.

19. The vehicle of claim 18, wherein the power train system further comprises a second drive train assembly operatively connected to the transfer case, and wherein the transfer case assembly comprises an all-wheel-drive system.

20. The vehicle of claim 19, wherein the all-wheel-drive system comprises a sensor system that is operable to detect the speeds of the first drive train assembly and of the second drive train assembly.

* * * * *